3,354,092
AMMONIATED GRANULAR CLEANER
Ronald A. Perry, Cincinnati, Ohio, assignor to The Procter & Gamble Company, Cincinnati, Ohio, a corporation of Ohio
No Drawing. Continuation of application Ser. No. 452,850, May 3, 1965. This application Dec. 5, 1966, Ser. No. 599,674
3 Claims. (Cl. 252—137)

ABSTRACT OF THE DISCLOSURE

Stable, non-caking, ammoniated, alkaline, crystalline, granular, hard surface cleaning compositions which when dissolved in water are characterized by the presence and odor of ammonia, containing either or both of ammonium dihydrogen phosphate and diammonium hydrogen phosphate, a granular alkaline material and optionally a granular detergent.

---

This application is a continuation of application Ser. No. 452,850, filed May 3, 1965, now abandoned which in turn is a continuation-in-part of application Ser. No. 251,017, filed Jan. 14, 1963, and now abandoned.

This invention relates to an improved alkaline, crystalline, granular hard-surface cleaning composition. More specifically, it relates to a composition, that when added to water to form an ammonia-containing solution, gives an ammonia odor although no noticeable ammonia odor is present around the dry product. The product is stable against loss of ammonia and against caking in storage.

It is recognized that the odor of ammonia is associated in many people's minds with cleaning from their early experiences in observing the use of household ammonia as a cleaning aid. Consequently, the odor of ammonia has connotations of effective cleaning to those people. In an effort to duplicate the odor of household ammonia, many ammonium salts have been suggested for addition to compositions of the type described in this application. For instance, ammonium chloride, ammonium sulfate, and ammonium bicarbonate have all been suggested for the purpose of adding ammonia and an ammonia odor to the solutions of this type of composition. The suggested compounds, and many other compounds have been found to possess one or more of the following deficiencies; loss of ammonia in storage, tendency to promote caking of the composition under high humidity conditions, ammoniacal odor of the dry product, cleaning inertness, etc. These deficiencies often make it necessary to provide special packaging materials to protect the compositions in storage.

Accordingly, it is an object of this invention to provide an alkaline, crystalline, granular, hard-surface cleaning composition which will avoid the deficiencies hereinbefore described and which will be stable against loss of ammonia and against caking in storage.

The object of this invention can be accomplished by preparing an ammoniated, non-caking, alkaline, granular, crystalline, hard-surface cleaning composition consisting essentially of:

A. From 0% to about 34% ammonium dihydrogen phosphate;
B. From 0% to about 20% diammonium hydrogen phosphate;
C. From about 40% to about 97% of at least one granular alkaline material selected from the group consisting of trisodium phosphate, disodium hydrogen phosphate, sodium tripolyphosphate, tetrasodium pyrophosphate, sodium carbonate, sodium sesquicarbonate, sodium tetraborate pentahydrate, and mixtures thereof; and, optionally,
D. From about 0% to about 25% of a granular detergent surfactant. The total of A plus B should be sufficient to provide from about 0.75% to about 5% ammonia in the composition.

Both the ammonium dihydrogen phosphate and diammonium hydrogen phosphate are a source of ammonia odor in an alkaline soluton of the compositions of this invention. Both are stable compounds which, surprisingly, under a wide variety of conditions of temperature and humidity, do not lose ammonia readily in storage and which do not promote caking of the compositions of this invention in storage. These ammonium salts of orthophosphoric acid are added, as hereinbefore described, in an amount to give a certain percentage of ammonia by weight in the composition. As little as about 0.75%, by weight of the composition, of ammonia provides a noticeable and useful amount of ammonia in washing solution for cleaning and odor purposes, and up to about 5% ammonia by weight of the composition can be used.

The ammonium phosphate compounds of the compositions of this invention are useful cleaning compounds as well as sources of ammonia since they will react in alkaline media to give the same phosphate ions as the trisodium phosphate and disodium hydrogen phosphate salts. Thus, unlike prior art ammonia-supplying salts such as ammonium chloride or sulfate, the ammonium phosphate salts of this invention have an appreciable cleaning effect.

The sodium orthophosphates and tripolyphosphates can be used in the compositions of this invention for their usual detergency effect. These materials are interchangeable in that they both have a detergency effect on, for example, hard surfaces.

The sodium sesquicarbonate and tetraborate can be used as detergency salts or as buffers with other alkaline salts where the pH of the compositions of this invention would be too high without said buffers being present. A pH of from about 9.5 to about 10.5 is preferred for a cleaning solution concentration of from about 1 to about 2 percent by weight. The choice of buffering material, if used, is dependent upon availability, the pH of the other salts in the composition, the use intended for said compositions, etc. Sodium sesquicarbonate and a one to one (on a molar basis) mixture of sodium bicarbonate and sodium carbonate will give the same ions in solution, and are considered equivalents. Additionally, if the composition is to be used in a no-rinse, no-wipe method on surfaces which will show a film, there is an advantage in using sodium tetraborate as an alkaline component rather than the carbonic acid salts, either alone or in a ratio of from 1:1 to 1.8:1 (sodium tetraborate:carbonate) as a partial replacement for the carbonic acid salts.

The detergent surfactant, if used, should be present in the form of a granule. It must, therefore, be capable of existing as a solid material, either alone or in combination with other materials. For example, certain non-ionic detergent-surfactants are normally liquids yet when they are combined with inorganic salts such as $Na_2SO_4$ or the alkaline salts described above, they can be formed into particulate matter.

Examples of suitable detergent surfactants include:
(1) Ordinary alkali metal soaps such as the sodium and potassium salts of the higher fatty acids of naturally occurring plant or animal esters (e.g., palm oil, coconut oil, babassu oil, soybean oil, castor oil, tallow, whale and fish oils, grease and lard, and mixtures thereof) or of synthetically produced fatty acids (e.g., by the oxidation of petroleum, or by hydrogenation of carbon monoxide by the Fischer-Tropsch process), of resin acid (e.g., rosin and those resin acids in tall oil) and/or of naphthenic acids. Sodium and potassium soaps can be made by direct saponification of the fats and oils or by the neutralization of the free fatty acids which are prepared in a separate manufacturing process.

(2) Synthetic organic detergents characterized by their high solubility in water, their resistance to precipitation by the constituents of hard water and their surface active and effective detergent properties, including:

(a) Anionic synthetic detergents (excluding true soaps): This class of synthetic detergents can be broadly described as the water-soluble salts, particularly the alkali metal salts, of organic sulfuric reaction product having in the molecular structure an alkyl radical containing from about 8 to about 22 carbon atoms and a radical selected from the group consisting of sulfonic acid and sulfuric acid ester radicals. Important examples of the synthetic detergents which form a part of the preferred compositions of the present invention are the sodium or potassium alkyl sulfates, especially those obtained by sulfating the higher alcohols produced by reducing the glycerides of tallow or coconut oil; sodium or potassium alkyl benzene sulfonates, in which the alkyl group contains from about 9 to about 15 carbon atoms, especially those of the types described in United States Letters Patents Numbers 2,220,099 and 2,477,383; sodium alkyl glyceryl ether sulfonates, especially those ethers of the higher alcohols derived from tallow and coconut oil; sodium coconut oil fatty acid monoglycerides sulfates and sulfonates; sodium or potassium salts of sulfuric acid esters of the reaction product of one mole of a higher fatty alcohol (e.g., tallow or coconut oil alcohols) and about three moles of ethylene oxide; sodium or potassium salts of alkyl phenol ethylene oxide ether sulfate with about four units of ethylene oxide per molecule and in which the alkyl radicals contain about 9 carbon atoms; the reaction product of fatty acids esterified with isethionic acid and neutralized with sodium hydroxide where, for example, the fatty acids are derived from coconut oil; sodium or potassium salts of fatty acid amide of a methyl taurine in which the fatty acids, for example, are derived from coconut oil; and others known in the art, a number being specifically set forth in United States Letters Patent Numbers 2,486,921, 2,486,922 and 2,396,278.

(b) Nonionic synthetic detergents: This class of synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic groups can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with an hydrophobic base formed by the condensation of propylene oxide with propylene glycol. The hydrophobic portion of the molecule which, of course, exhibits water insolubility has a molecular weight of from about 1500 to 1800. The addition of polyoxyethylene radicals to this hydrophobic portion tends to increase the water solubility of the molecule as a whole and the liquid character of the products is retained up to the point where polyoxyethylene content is about 50% of the total weight of the condensation product.

Other suitable nonionic synthetic detergents include:

(i) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 10 to 25 moles of ethylene oxide per mole of alkyl phenol. The alkyl substituent in such compounds may be derived from polymerized propylene, diisobutylene, octane, or nonane, for example.

(ii) Those derived from the condensation of ethylene oxide with the product resulting from the reaction of propylene oxide and ethylene diamine—products which may be varied in composition depending upon the balance between the hydrophobic and hydrophilic elements which is desired. For example, compounds containing from about 40% to about 80% polyoxyethylene by weight and having a molecular weight of from about 5000 to about 11,000, resulting from the reaction of ethylene oxide groups with a hydrophobic base, constituted of the reaction product of ethylene diamine and excess propylene oxide, said base having a molecular weight of the order of 2500 to 3000, are satisfactory.

(iii) The condensation product of aliphatic alcohols having from 8 to 18 carbon atoms, in either straight chain or branched chain configuration, with ethylene oxide, e.g., a coconut alcohol ethylene oxide condensate having from 10 to 30 moles of ethylene oxide per mole of coconut alcohol, the coconut alcohol fraction having from 10 to 14 carbon atoms.

(iiii) Trialkyl amine oxides and trialkyl phosphine oxides wherein one alkyl group ranges from 10 to 18 carbon atoms and two alkyl groups range from 1 to 3 carbon atoms; the alkyl groups can contain hydroxy substituents; specific examples are dodecyl diethanol amine oxide and tetra decyl dimethyl phosphine oxide.

(c) Zwitterionic detergents such as betaine and betaine-like detergents wherein the molecule contains both basic and acidic groups which form an inner salt giving the molecule both cationic and anionic hydrophilic groups over a broad range of wash water pH values. Some common examples of these detergents are described in U.S. Patents 2,082,275, 2,702,279, and 2,255,082.

(d) Amphoteric and ampholytic detergents which can be either cationic or anionic depending upon the pH of the system and which are represented by detergents such as dodecyl-beta-alanine, N-alkyltaurines such as the one prepared by reacting dodecylamine with sodium isethionate according to the teaching of U.S. 2,658,072, N-higher alkylaspartic acids such as those produced according to the teaching of U.S. 2,438,091, and the products sold under the trade name "Miranol" and described in U.S. 2,528,378.

The compositions can also contain water of hydration, inert salts such as $Na_2SO_4$ (as fillers); and in minor amounts, dyes, optical brighteners, tarnish inhibitors, perfumes, etc., without detracting from the advantageous properties of the composition.

A preferred composition of this invention contains from about 15 to about 25 percent $Na_5P_3O_{10}$; from about 15 to about 25 percent $Na_2CO_3$; from about 45 to about 55 percent $Na_3H(CO_3)_2 \cdot 2H_2O$; from about 6 to about 12 percent $NH_4H_2PO_4$; and from about 1 to about 3 percent granular detergent surfactant, all percentages herein being by weight.

The following example illustrates, but does not limit, the practice and advantages of this invention.

*Example I*

TABLE A

| Composition | 1 | 2 | 3 | 4 | 5 |
|---|---|---|---|---|---|
| $Na_3PO_4 \cdot 12H_2O$ | 20 | 20 | 20 | 20 | 20 |
| $Na_5P_3O_{10}$ | 20 | 20 | 20 | 20 | 20 |
| $Na_3H(CO_3)_2 \cdot 2H_2O$ | 53.6 | 52.7 | 51.7 | 48.9 | 52.7 |
| $NH_4Cl$ | 4.1 | | | | |
| $(NH_4)_2SO_4$ | | 5.0 | | | |
| $(NH_4)HCO_3$ | | | 6.0 | | |
| $(NH_4)H_2PO_4$ | | | | 8.8 | |
| $(NH_4)_2HPO_4$ | | | | | 5.0 |
| Detergent granules | 2.3 | 2.3 | 2.3 | 2.3 | 2.3 |

The ammonium salts were added in sufficient amounts to give approximately 1.3 percent ammonia in the final product. The detergent granules are approximately 40% sodium tetrapropylene benzene sulfonate and substantially all the balance of the detergent granules is sodium sulfate. Compositions 4 and 5 are exemplary of, and within the scope of, the invention. The pH of all the compositions ranges from 9.5 to 10.5 in aqueous solution when used in a concentration of from 1 to 2 percent by weight.

The above compositions were tested in the following manner. The compositions were placed respectively in both open and sealed cartons. These cartons were stored for a period of 14 days at (A) 80° F. and 80% relative humidity, (B) 80° F. and ambient humidity, and (C) 120° F. and ambient humidity and high temperature which are the most difficult storage conditions. Representative cartons, both open and closed, were taken out of storage after 3, 7 and 14 days; the closed cartons were opened; all cartons were placed at an angle of 145° from the vertical and subjected to mechanical shaking; and the percent volume of the composition which flowed out was determined. A high number indicates good pourability; a lower number indicates poorer pourability.

Each of the compositions was checked to determine if ammonia odor was present above the dry composition; an aqueous solution of the composition after storage was also checked for the odor of ammonia.

Results of these tests are shown in Tables B and C below.

TABLE B.—PERCENT VOLUME POURABLE FROM CARTON
(Open carton)/(sealed carton)

| Composition | 1 | 2 | 3 | 4 | 5 |
|---|---|---|---|---|---|
| 80° F., 80% relative humidity: | | | | | |
| 3 days | 100/100 | 100/100 | 100/100 | 100/100 | 100/100 |
| 7 days | 94/84 | 94/100 | 100/100 | 100/90 | 100/100 |
| 14 days | 42/56 | 67/68 | 91/97 | 82/77 | 100/79 |
| 80° F., ambient humidity | (¹) | (¹) | (¹) | (¹) | (¹) |
| 120° F., ambient humidity: | | | | | |
| 7 days | 100/100 | 100/100 | 53/32 | 100/100 | 100/100 |
| 14 days | 93/100 | 100/100 | 100/100 | 100/100 | 100/100 |

¹ All readings 100.

TABLE C.—PRESENCE OF ODOR OF AMMONIA OVER DRY COMPOSITION
(Open carton)/(sealed carton)

| Composition | 1 | 2 | 3 | 4 | 5 |
|---|---|---|---|---|---|
| 80° F., 80% relative humidity: | | | | | |
| 3 days | No/no | No/no | No/no | No/no | No/no. |
| 7 days | No/no | No/no | Yes/yes | No/no | No/no. |
| 14 days | Yes/yes | Yes/yes | Yes/yes | No/no | No/no. |
| 80° F., ambient humidity: | | | | | |
| 3 days | No/no | No/no | No/no | No/no | No/no. |
| 7 days | No/no | No/no | No/no | No/no | No/no. |
| 14 days | No/no | Yes/yes | Yes/yes | No/no | No/no. |
| 120° F., ambient humidity | (¹) | (¹) | (¹) | (¹) | (¹) |

¹ No odor for any composition.

TABLE D.—PRESENCE OF ODOR OF AMMONIA OVER SOLUTION OF COMPOSITION
(Open carton)/(sealed carton)

| Composition | 1 | 2 | 3 | 3 | 5 |
|---|---|---|---|---|---|
| 80° F., 80% relative humidity: | | | | | |
| 3 days | Yes/yes | Yes/yes | Yes/yes | Yes/yes | Yes/yes. |
| 7 days | Yes/yes | Yes/yes | Yes/yes | Yes/yes | Yes/yes. |
| 14 days | No/no | Yes/yes | No/no | Yes/yes | Yes/yes. |
| 80° F., ambient humidity | (¹) | (¹) | (¹) | (¹) | (¹) |
| 120° F., ambient humidity: | | | | | |
| 7 days | Yes/yes | Yes/yes | Yes/yes | Yes/yes | Yes/yes. |
| 14 days | Yes/yes | Yes/yes | No/no | Yes/yes | Yes/yes. |

¹ All compositions gave a detectable odor except $(NH_4)HCO_3$ in an unsealed carton after 14 days.

The above results show the overall advantages and superiority of the compositions of this invention. For example, all three salts which have been used in prior art ammonia compositions [$NH_4Cl$, $(NH_4)_2SO_4$, and $NH_4HCO_3$] lost ammonia under conditions of high humidity as evidenced by the smell of ammonia detectable over the dry compositions after 14 days. In fact, two of these salts ($NH_4Cl$ and $NH_4HCO_3$) had lost a substantial portion of their ammonia after only 14 days as established by the lack of an ammonia odor from their solutions. Loss of ammonia in storage is a grave deficiency in a composition that is supposed to provide ammonia in solution and have an ammonia odor. The compositions of this invention (4 and 5) did not lose a detectable amount of ammonia during these tests.

The pour test (Table A) demonstrates the acceptability of the instant compositions in that Compositions 4 and 5 remained pourable under the most drastic conditions. In fact, under the conditions of high humidity, the compositions of this invention, which had retained their ammonia, were more pourable than two other compositions (1 and 2).

Compositions 4 and 5 were granular and crystalline; both have special utility as hard-surface cleaning compositions when used in aqueous solution at a 1%–2% concentration, for example. The ammonia in solution provides an ammonia odor as well as some ammonia as a cleaning aid.

Tetrasodium pyrophosphate and sodium carbonate can be substituted in whole or in part for the $Na_3PO_4 \cdot 12H_2O$, $Na_3H(CO_3)_2 \cdot 2H_2O$ and $Na_5P_3O_{10}$ in Compositions 4 and 5, with substantially equivalent results. The detergent granules can be left out of the composition with substantially equivalent results except for a small decrease in cleaning efficiency. Disodium hydrogen phosphate can be substituted in whole or in part for the $Na_3PO_4 \cdot 12H_2O$, $Na_3H(CO_3)_2 \cdot 2H_2O$ and $Na_5P_3O_{10}$, so long as the pH is maintained in generally the preferred range of alkalinity, i.e., about 9.5 to about 10.5.

Example II

The following compositions represent typical embodiments of this invention. When the following compositions are tested as in Example I, they are superior to compositions containing conventional prior art sources of ammonia in retention of ammonia during storage, pourability, etc.

TABLE E
[Percent by weight]

| Compositions | 6 | 7 | 8 | 9 | 10 | 11 | 12 | 13 |
|---|---|---|---|---|---|---|---|---|
| $Na_3PO_4 \cdot 12H_2O$ | | | | 20.00 | 20.00 | 20.00 | | 91.00 |
| $Na_5P_3O_{10}$ | 20.00 | 20.00 | 20.00 | | | | 20.00 | |
| $Na_2CO_3$ | 20.00 | 20.00 | 20.00 | | | | 30.70 | |
| $Na_3H(CO_3)_2 \cdot 2H_2O$ | 48.70 | 50.20 | 45.60 | | | | | |
| $Na_2HPO_4$ | | 2.30 | 5.00 | | | | | |
| $Na_4P_2O_7$ | | | | 8.40 | 19.60 | 14.00 | 20.00 | |
| $Na_2B_4O_7 \cdot 5H_2O$ | | | | 20.00 | 20.00 | 20.00 | 30.70 | |
| $(NH_4)H_2PO_4$ | | | | 26.20 | | 13.10 | 8.45 | 9.00 |
| $(NH_4)_2HPO_4$ | 9.00 | | 4.50 | | 15.00 | 7.50 | 4.85 | |
| Sodium alkyl benzene sulfonate granules [1] | 2.30 | 5.20 | 2.60 | | | | 2.30 | |
| Sodium coconut alkyl sulfate granules [2] | | 2.30 | 2.30 | 25.40 | 25.40 | 25.40 | | |
| Plurafac RA-30 [3] | | | | | | | 1.00 | |
| Sodium carboxymethylcellulose | | | | | | | 2.00 | |
| Total, percent | 100 | 100 | 100 | 100 | 100 | 100 | 100 | 100 |
| Percent $NH_3$ | 1.33 | 1.33 | 1.33 | 3.87 | 3.87 | 3.87 | 2.50 | 1.33 |
| Percent sodium alkyl benzene sulfonate active [1] | 0.9 | 0.9 | 0.9 | | | | 0.9 | 0.9 |
| Percent sodium coconut alkyl sulfate active [2] | | | | 5.0 | 5.0 | 5.0 | | |

[1] The granules contain: about 40% sodium alkyl benzene sulfonate wherein the alkyl group averages about 12 carbon atoms; about 4% sodium toluene sulfonate; about 2% water; about 12% NaCl; about 41% $Na_2SO_4$; and about 1% disodium acid pyrophosphate.
[2] The granules contain: about 20% sodium coconut alkyl sulfate wherein the alkyl groups contain 2% $C_{10}$, 66% $C_{12}$, 23% $C_{14}$ and 9% $C_{16}$; about 31% sodium tripolyphosphate; about 41% sodium sulfate; about 5% sodium silicate (1.6 $SiO_2$:$Na_2O$); and about 3% water.
[3] A commercial product which is the condensation product of a fatty alcohol and ethylene oxide.

What is claimed is:

1. A water-soluble ammoniated, non-caking, alkaline, granular, crystalline, hard-surface cleaning composition consisting essentially of:
    (A) from 0% to about 34% ammonium dihydrogen phosphate;
    (B) from 0% to about 20% diammonium hydrogen phosphate; and
    (C) from about 40% to about 97% of at least one granular alkaline material selected from the group consisting of trisodium phosphate, disodium hydrogen phosphate, sodium tripolyphosphate, tetrasodium pyrophosphate, sodium carbonate, sodium sesquicarbonate, sodium tetraborate pentahydrate, and mixtures thereof; the total of A plus B being sufficient to provide from about 0.75% to about 5% ammonia by weight of the composition, said composition giving a pH of from about 9.5 to about 10.5 when it is dissolved in water at a concentration of from about 1% to about 2% by weight.

2. The composition of claim 1 containing as an added ingredient from 0 to about 25% of a granular detergent selected from the group consisting of anionic, nonionic, zwitterionic, and amphoteric detergents.

3. A water-soluble ammoniated, non-caking, alkaline, granular, crystalline, hard-surface cleaning composition of claim 1 consisting essentially of: about 15 to about 25% $Na_5P_3O_{10}$; about 15 to about 25% $Na_2CO_3$; about 45 to about 55% $Na_3H(CO_3)_2 \cdot 2H_2O$; about 6 to about 12% $NH_4H_2PO_4$; and about 1 to about 3% granular detergent selected from the group consisting of anionic, nonionic, zwitterionic, and amphoteric detergents; said composition giving a pH of from about 9.5 to about 10.5 when it is dissolved in water at a concentration of from about 1% to about 2% by weight.

References Cited

UNITED STATES PATENTS 2,717,243  9/1955  Bloch et al. _____ 252—138

FOREIGN PATENTS 551,616  3/1943  Great Britain.

OTHER REFERENCES

Bennett: The Chemical Formulary, vol. IX (p. 95 relied on), Chem. Pub. Co., Inc., New York, N.Y., copyright 1951.

LEON D. ROSDON, *Primary Examiner.*

J. T. FEDIGAN, *Assistant Examiner.*